(12) United States Patent
Schwartz

(10) Patent No.: US 9,148,579 B1
(45) Date of Patent: Sep. 29, 2015

(54) FUSION NIGHT VISION SYSTEM

(71) Applicant: Sheldon Schwartz, Boston, MA (US)

(72) Inventor: Sheldon Schwartz, Boston, MA (US)

(73) Assignee: L-3 Communications Corporation

( * ) Notice: Subject to any disclaimer, the term of this patent is extended or adjusted under 35 U.S.C. 154(b) by 186 days.

(21) Appl. No.: 13/828,816

(22) Filed: Mar. 14, 2013

(51) Int. Cl.
*H01L 31/00* (2006.01)
*H04N 5/235* (2006.01)
*H04N 5/33* (2006.01)

(52) U.S. Cl.
CPC .................. *H04N 5/235* (2013.01); *H04N 5/33* (2013.01); *H04N 5/332* (2013.01)

(58) Field of Classification Search
USPC ........................................................ 250/330
See application file for complete search history.

(56) References Cited

U.S. PATENT DOCUMENTS

| 4,653,879 | A | * | 3/1987 | Filipovich | 250/330 |
| 4,961,626 | A | * | 10/1990 | Fournier et al. | 359/630 |
| 6,259,088 | B1 | * | 7/2001 | Antesberger | 250/214 VT |
| 2004/0042086 | A1 | * | 3/2004 | Beystrum et al. | 359/629 |
| 2007/0235634 | A1 | * | 10/2007 | Ottney et al. | 250/214 VT |

* cited by examiner

*Primary Examiner* — Christine Sung

(57) ABSTRACT

A fusion night vision system has an optical element coupled to a display for improving the performance and viewability of images through a fusion night vision device while reducing overall system cost. The display producing a scene image from an image detector. The optical element has a flat input surface and a curved output surface. The curved output surface shaped to match an output surface of an image intensifier tube. The output from the display and the image intensifier being combined in an image combiner before entering an eyepiece for presentation to an operator as a fused image.

10 Claims, 5 Drawing Sheets

FUSION NIGHT VISION SYSTEM

CROSS REFERENCE TO RELATED APPLICATIONS

The present application claims the benefit under 35 U.S.C. 120 to U.S. patent application Ser. No. 11/928,328, filed Oct. 30, 2007, which is a continuation application of U.S. patent application Ser. No. 11/173,234, filed Jul. 1, 2005, now U.S. Pat. No. 7,307,793, the entire disclosures of which are incorporated herein by reference in their entirety.

TECHNICAL FIELD

The invention is generally related to night vision devices and, more particularly, to systems and methods for improving the performance and viewability of images through a fusion night vision device.

BACKGROUND OF THE INVENTION

Night vision systems include image intensification, thermal imaging, and fusion monoculars, binoculars, and goggles, whether hand-held, weapon mounted, or helmet mounted. Standard night vision systems are typically equipped with one or more image intensifier tubes to allow an operator to see visible wavelengths of radiation (approximately 400 nm to approximately 900 nm). They work by collecting the tiny amounts of light, including the lower portion of the infrared light spectrum, that are present but may be imperceptible to our eyes, and amplifying it to the point that an operator can easily observe the image. These devices have been used by soldier and law enforcement personnel to see in low light conditions, for example at night or in caves and darkened buildings. These devices take ambient light and magnify the light up to and in excess of 50,000 times and display the image for viewing through an eyepiece. A drawback to night vision goggles is that they cannot see through smoke and heavy sand storms and cannot see a person hidden under camouflage.

Infrared thermal sensors allow an operator to see people and objects because they emit thermal energy. These devices operate by capturing the upper portion of the infrared light spectrum, which is emitted as heat by objects instead of simply reflected as light. Hotter objects, such as warm bodies, emit more of this wavelength than cooler objects like trees or buildings. Since the primary source of infrared radiation is heat or thermal radiation, any object that has a temperature radiates in the infrared spectrum. One advantage of infrared sensors is that they are less attenuated by smoke and dust and a drawback is that they typically do not have sufficient resolution and sensitivity to provide acceptable imagery of the scene and cannot be used to read road signs.

Fusion systems have been developed that combine image intensification with thermal image sensing. The image intensification information and the infrared information is optically combined to provide a fused image that provides benefits over just image intensification or just thermal sensing. Whereas typical night vision devices with image intensification can only see visible wavelengths of radiation, the fused system provides additional information by providing heat information to the operator.

According to one aspect of the invention, there is provided a fusion night vision system including a housing, an image intensifier for processing information in a first range of wavelengths, the image intensifier having a first curved output image surface, an image detector for processing information in a second range of wavelengths, a display for displaying processed information from the image detector, an image combiner for combining the output from the image intensifier with the output of the image detector, and an optical element aligned with the display and an input to the image combiner, the optical element having a generally flat input surface and a curved output surface.

BRIEF DESCRIPTION OF THE DRAWINGS

For a better understanding of the invention, together with other objects, features and advantages, reference should be made to the following detailed description which should be read in conjunction with the following figures wherein like numerals represent like parts.

DETAILED DESCRIPTION

Figure 3:
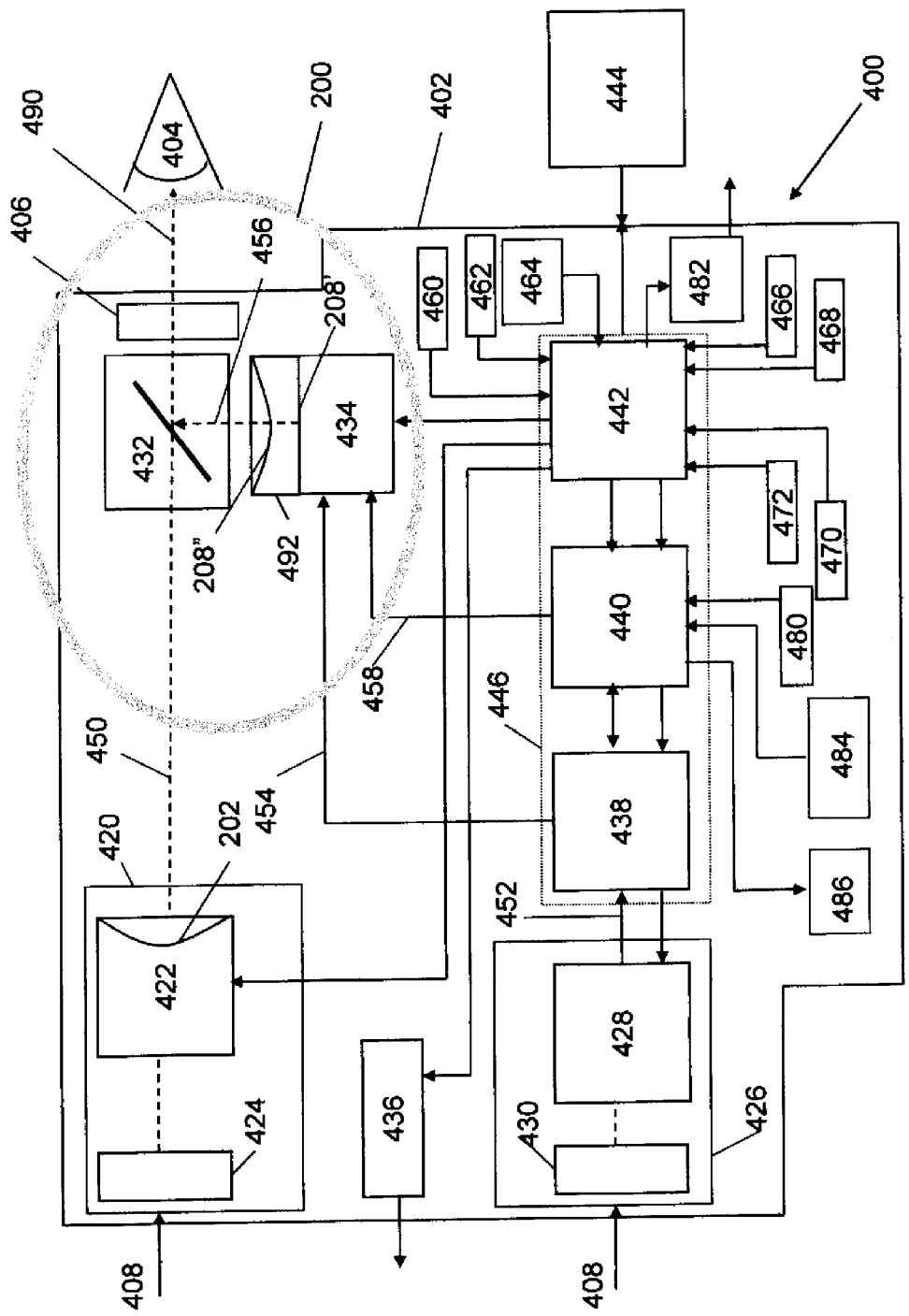
FIG. 3 is a block diagram of an optically fused night vision monocular.
Figure 4:
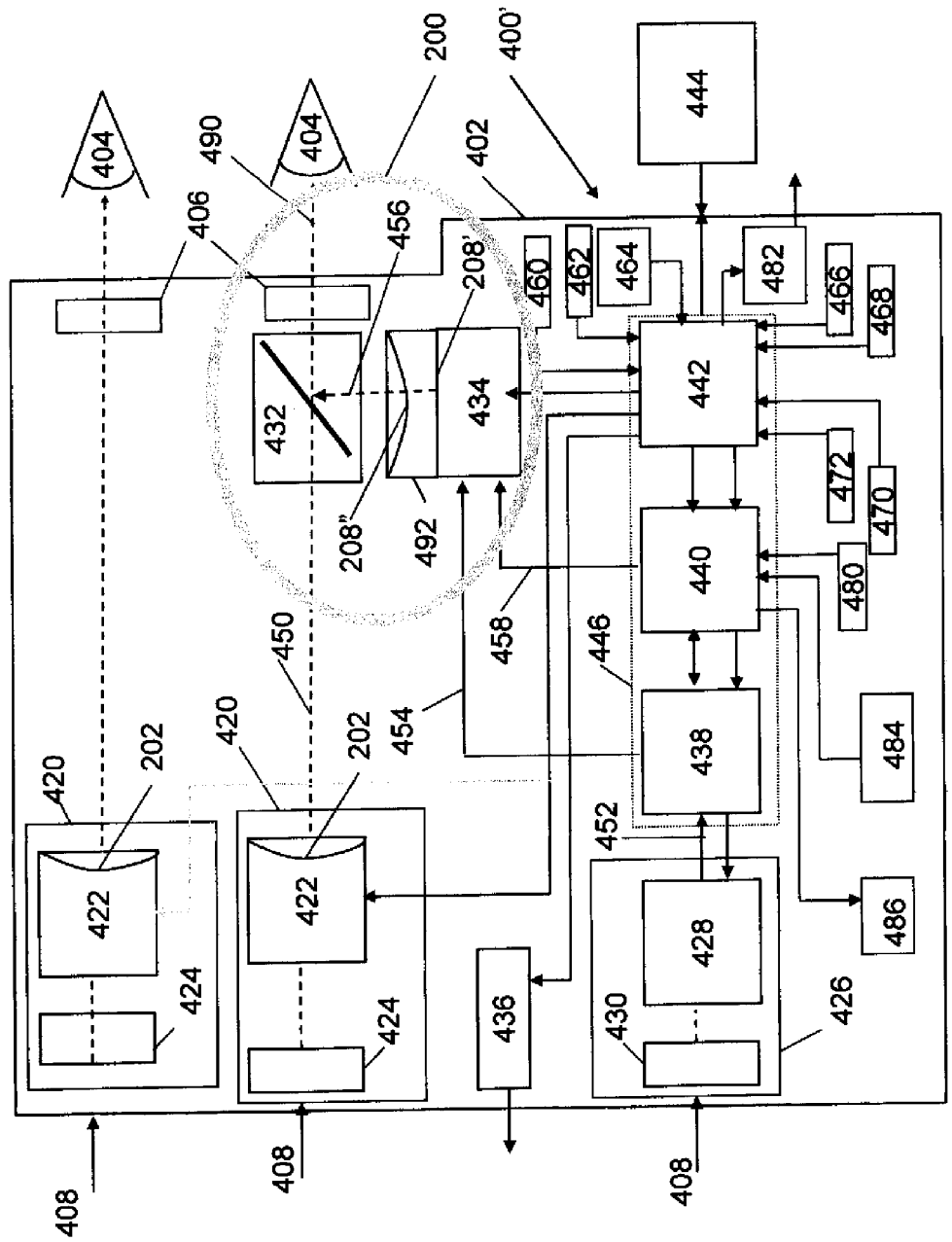
FIG. 4 is a block diagram of an optically fused night vision binocular.
Figure 5:
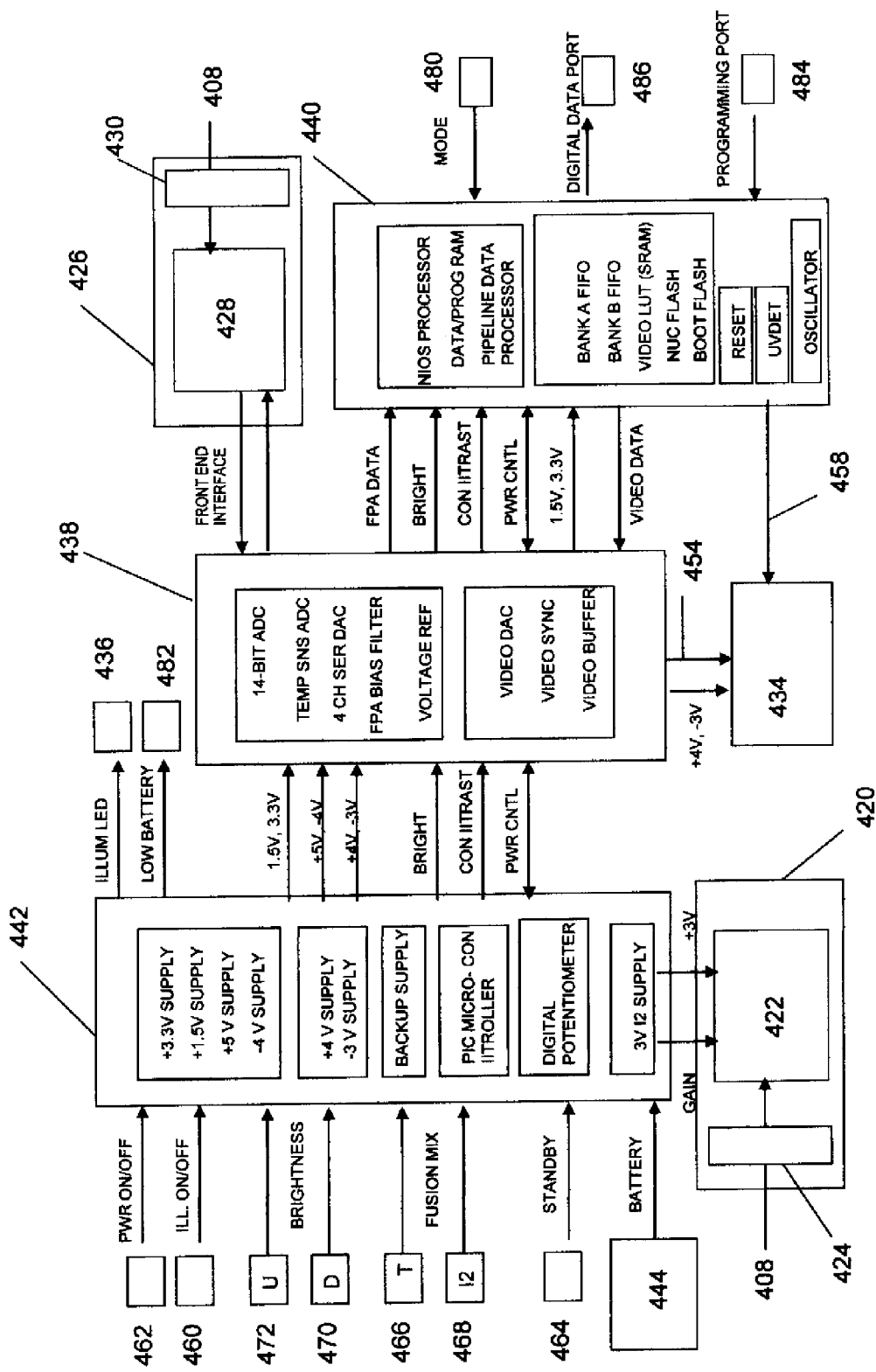
FIG. 5 is a block diagram detailing interconnections between blocks shown in the optically fused night vision monocular of FIG. 3.

FIG. 3 is a block diagram of a first optically fused night vision system configured as a monocular 400; FIG. 4 is a block diagram of a second optically fused night vision system configured as a binocular 400'; and FIG. 5 is a block diagram detailing interconnections between blocks shown in the optically fused night vision monocular of FIG. 3 consistent with the current disclosure. The system electronics and optics may be housed in a housing 402, which can be mounted to a military helmet.

An operator 404 looking through an eyepiece 406 within the housing 402 may be able to see a fused image 490 of a target 408. Enclosed at least partially within the housing 402 may be an image intensifier ($I^2$) tube 422, an infrared (IR) image detector 428, for example a focal plane array (FPA), a combiner optics 432, a display 434, an illumination LED 436, an analog circuit card assembly 438, a digital circuit card assembly 440, and a power circuit card assembly 442. Suitable $I^2$ tubes 422 may be Generation HI tubes and are available from L-3 Communication Corporation and ITT.

The focal plane array may be a U7000J from DRS. Other image detectors including near infrared electron bombarded active pixel sensors and short wave InGaAs arrays operating in other wavelengths, may be used without departing from this disclosure. Image detectors operating in the same wavelength may be used together. Information from the $I^2$ tube 422 and the IR image detector 428 may be fused together for viewing by an operator through the one or more eyepieces 406. The eyepiece(s) 406 have one or more ocular lenses for magnifying and/or focusing the fused image. The $I^2$ tube 422 may be configured to process information in a first range of wavelengths (the visible portion of the electromagnetic spectrum from 400 nm to 900 nm) and the IR image detector 428 may be configured to process information in a second range of wavelengths (7,000 nm-14,000 nm). The $I^2$ tube 422 may have an objective focus 424 and the IR image detector 428 may have an objective focus 426.

The analog circuit card assembly 438, the digital circuit card assembly 440, and the power circuit card assembly 442 may be combined on a single flexible circuit assembly 446. The display 434 may be a yellow monochrome organic light emitting diode (OLED) microdisplay available from eMagin Corp. as part no. EMA-100116. The fusion night vision system 400, 400' may be powered by a separate and removably disconnectable battery pack 444.

Figure 1:
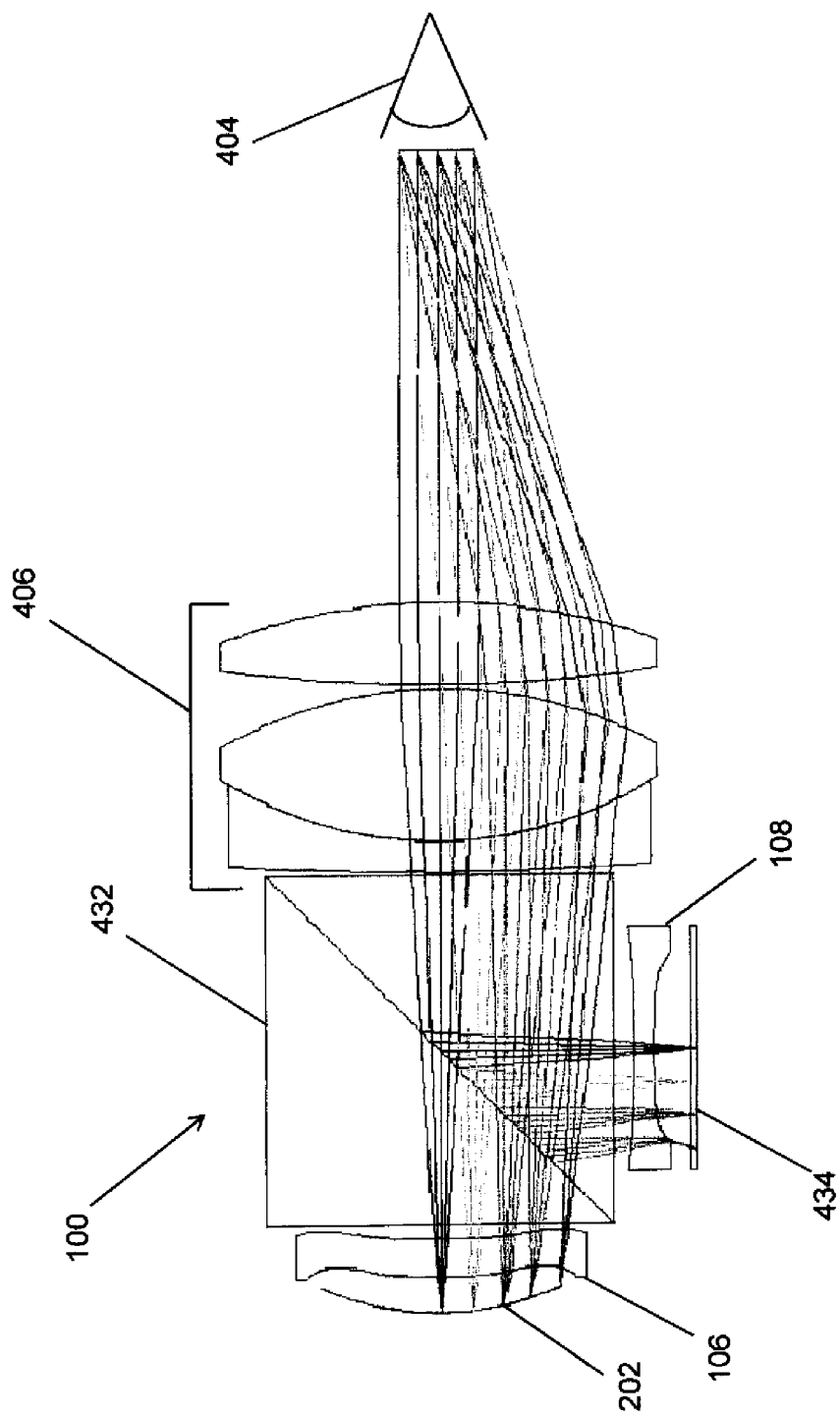
FIG. 1 is a ray trace of a portion of an optically fused night vision system.

Scene information 450 from the image intensifier tube 422 may be directed into optics 432, for example a partially reflective beam combiner and information 452 from the image detector 428 may be directed into the system electronics on the analog circuit card assembly 438. An analog video out signal 454 from the analog circuit card assembly 438 may be inputted into the display 434. A serial bus 458 coupled to the digital circuit card assembly 440 may control the size, resolution, and offset of the display 434. An output 456 from the display 434 may be directed through a first optical element 108 (see FIG. 1), for example a lens having a curved input and curved output surface, towards the image combiner 432 and then the fused image 490 is directed towards the operator 404. The first optical element 108 may be aligned with the display 492. A second optical element 106 may be disposed between an output image plane 202 of the image intensifier tube 422 and the image combiner 432.

Figure 2:
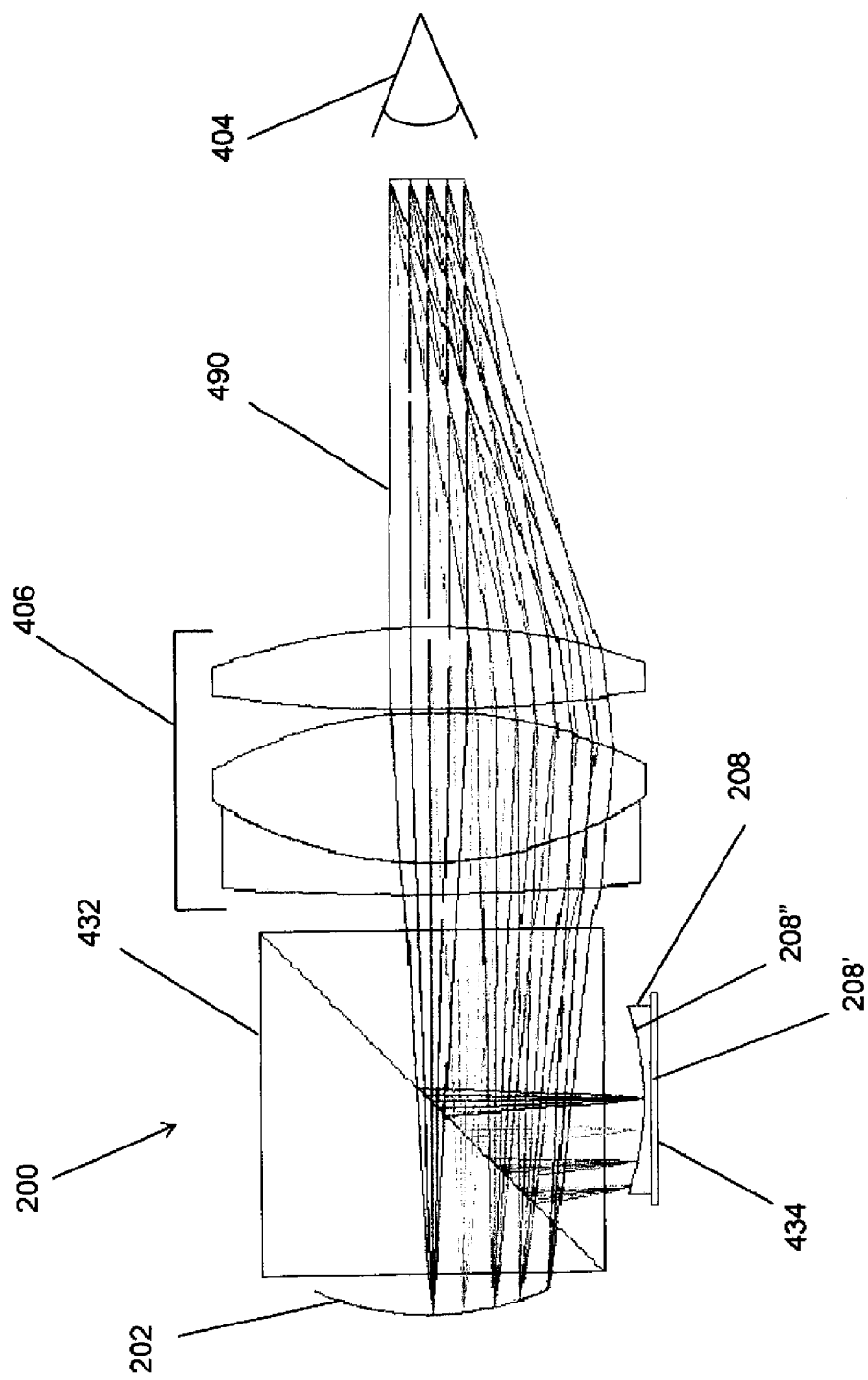
FIG. 2 is a ray trace of a portion of an optically fused night vision system consistent with the current disclosure.

Alternatively, as shown in FIG. 2, an optical element 208, for example a glass or fiber optic bundle may be disposed between the display 434 and the image combiner 432. The optical element 208 may be aligned with the display 492 and then coupled to the display with an adhesive. The optical element 208 may be have a generally flat input surface 208' and a curved output surface 208". The curved output surface 208" may have a concave shape that cooperates with the curved output image plane 202 of the image intensifier tube 422 to improve viewability of the fused image as the eyepiece 406 is moved relative to the optic 432. The output surface 208" may have a radius of curvature similar to the output surface 202 of the image intensifier tube 422. The eyepiece 406 may be moved relative to the optic 432 in fusion night vision system 400, 400' to provide diopter adjustment to accommodate vision corrections unique to each user without compromising precision registration between the two images (from the display 434 and the output of the image intensifier tube 422). If both the image from the image intensifier tube and the image detector are to be affected identically by diopter adjustment, they must have identical effective focal length and identical distortion curves. By properly shaping the output surface of the optical element 208 to match the output image plane of the image intensifier tube, the system can achieve similarly shaped image planes and improve viewability of the fused image as diopter adjustments are made. Although the fiber bundle is shown with a flat display and an image intensifier tube having a curved output image plane, the bundle can be used with any system having two or more image planes having differing physical geometries. The bundle may be used even if the two image planes do not need to be the exact same shape, rather it can be used with any image plane that needs to be modified from its original geometry. No additional (106 and 108) optical elements may be required in this embodiment.

In an alternative embodiment, the optical element may be used in a system with an image intensifier and a display for displaying received digital information, for example digital map or target location information, instead of scene information from a detector and the combined image is the digital information overlayed on the scene information.

The fusion night vision system 400, 400' may have a plurality of user actuatable actuators including illumination LED actuator 460, power on/off actuator 462, stand-by actuator 464, increase perceived mix of thermal to $I^2$ information actuator 466, increase perceived mix of $I^2$ to thermal information actuator 468, brightness down actuator 470, brightness up actuator 472, and thermal mode select actuator 480. The actuators may employ a silicone overlay over tactile dome switches. The overlay may be coupled to the housing 402 to seal out moisture and particulates and the dome switches may be coupled to a processor. The increase perceived mix of thermal to $I^2$ information actuator 466 and the increase perceived mix of $I^2$ to thermal information actuator 468 may be fixed together and rotatable about a pivot. Rotation of the combined actuator in a first rotational direction increases the perceived mix of information in the eyepiece from the $I^2$ channel and rotation of the actuator in a second rotational direction increases the perceived mix of information in the eyepiece from the thermal channel. The increase or decrease in the perceived mix of information in the eyepiece from the $I^2$ channel can be changed continuously (ramp) or in discrete steps by the processor.

The illumination LED actuator 460 may turn illumination LED 436 on and off. A single actuation of the illumination LED actuator 460 may turn the illuminating LED 436 on as long as the actuator 460 is actuated and a double tap (two actuations within a short period of time, for example 500 msec, may cause the illuminating LED 436 to latch on. A subsequent actuation of illumination LED actuator 460 may turn the illuminating LED 436 off. Stand-by actuator 464 may switch the system 400 to a lower power usage state without turning the system 400, 400' off. The thermal mode select actuator 480 allows the user to reverse the polarity of the image i.e. change the light pixels to dark and the dark pixels to light, enable or disable the edge detection filter circuit (to be discussed below), and calibrate the system. The fusion night vision systems 400, 400' may also have a low battery signal generator 482. The low battery signal generator 482 may generate a visible or an audible signal to the operator to signal that the batteries in the battery pack 444 are low. Alternatively, the low battery signal may be displayed in the display 434. The fusion night vision systems 400, 400' may also have a programming port 484 and a digital data port 486 for transferring data. Alternatively, the system 400 may utilize scroll actuators as discussed in relation to FIG. 3.

The fusion night vision systems 400, 400' may be called upon by the operator 404 to view the target 408 in a variety of adverse conditions, for example in very low light conditions, through smoke or heavy fog, and sand storms. In each of these conditions the operator may wish to rely more heavily on the image intensifier 422 than the image detector 428 and in other conditions the user may wish to rely more heavily on the image detector 428 than the image intensifier 422. The increase perceived mix of thermal to $I^2$ information actuator 466 and the increase perceived mix of $I^2$ to thermal information $I^2$ image actuator 468 may be actuated to adjust the perceived mix of information from the image intensifier 422 and the image detector 428 viewable through the eyepiece(s) 406, while generally maintaining the brightness of the display 434. At one extreme the viewable image contains generally 100% image intensification information, at the other extreme the viewable image contains generally 100% thermal information, and in between the two extremes, the power circuit card assembly 442 controls the mix of $I^2$ and thermal information to the eyepiece 406. The actuators 466, 468 may be coupled to a microcontroller on the power circuit card assembly 442 that controls the gain of the $I^2$ tube 428 and the contrast and brightness of the thermal image presented in display 434. The microcontroller may control a digital potentiometer coupled to the gain control input of the $I^2$ tube. As noted above, the increase or decrease may be ramped or stepped. The increase perceived mix of IR to $I^2$ information actuator 466 and the increase perceived mix of $I^2$ to IR information actuator 468 may be positioned on opposite ends of a rocker mechanism to prevent simultaneous actuation.

Certain embodiments of the invention can be implemented in hardware, software, firmware, or a combination thereof. In one embodiment, the filter circuit and/or the threshold comparator and clamp circuit are/is implemented in software or firmware that is stored in a memory and that is executable by a suitable instruction execution system. If implemented in hardware, as in an alternative embodiment, the circuits can be implemented with any or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The display 434 may be a miniature flat panel display, more particularly; it may be a monochrome organic light emitting diode (OLED) microdisplay or a liquid crystal display (LCD). The focal plane array and imaging electronics may be a micro bolometer imager currently available from L-3 or DRS. Other detectors capable of processing scene information, including a digital image intensification tube, a near infrared electron bombarded active pixel sensor, a short wave InGaAs array, a charged couple device, and a CMOS detector, may be used without departing from the invention.

Although several embodiments of the invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed is:

1. A fusion night vision system, comprising:
   a housing;
   an image intensifier for processing information in a first range of wavelengths, the image intensifier having a first curved output image surface;
   an image detector for processing information in a second range of wavelengths;
   a display for displaying processed information from the image detector;
   an image combiner for combining the output from the image intensifier with the output of the image detector; and
   an optical element aligned with the display and an input to the image combiner, the optical element having a generally flat input surface and a curved output surface.

2. The fusion night vision system of claim 1, wherein the image intensifier is optically aligned with the image combiner and an eyepiece to enable direct viewing of a scene by an operator and the image detector is optically aligned with an objective focus.

3. The fusion night vision system of claim 1, further comprising an eyepiece optically aligned with the optical image combiner to enable an operator to view a fused image from the image intensifier and the image detector.

4. The fusion night vision system of claim 1, wherein the first range of wavelengths is approximately 400 nm to approximately 900 nm and the second range of wavelengths is approximately 7,000 nm to approximately 14,000 nm.

5. The fusion night vision system of claim 1, wherein the image detector is a selected one of a focal plane array, a digital image intensification tube, a near infrared electron bombarded active pixel sensor, a short wave InGaAs array, a charged couple device, and a CMOS detector.

6. The fusion night vision system of claim 1, wherein the shape of the output surface of the optical element is shaped to match the first curved output surface of the image intensifier.

7. The fusion night vision system of claim 1, wherein the shape of the output surface of the optical element is shaped to provide for a clear fused image at an eyepiece as the eyepiece is moved towards and away from the image combiner.

8. The fusion night vision system of claim 7, further wherein the shape of the output surface of the optical element is shaped to maintain image registration over the full range of viewing positions.

9. The fusion night vision system of claim 1, wherein the optical element is coupled to the display.

10. A fusion night vision system, comprising:
    a housing;
    an image intensifier for processing information in a first range of wavelengths, the image intensifier having a first curved output image surface;
    an image detector for processing information in a second range of wavelengths;
    a display for displaying processed information from the image detector;
    an image combiner for combining the output from the image intensifier with the output of the image detector; and
    an optical element aligned with the display and an input to the image combiner, the optical element having a generally flat input surface and a curved output surface, wherein the radius of curvature of the optical element is the same radius of curvature as the first curved output image surface of the image intensifier.

* * * * *